United States Patent [19]
Shibutani et al.

[11] Patent Number: 5,504,826
[45] Date of Patent: Apr. 2, 1996

[54] OPTICAL MODULE FOR SUBCARRIER MULTIPLEXED OPTICAL TRANSMISSION SYSTEM

[75] Inventors: Makoto Shibutani; Wataru Domon, both of Tokyo, Japan

[73] Assignee: NEC Corporation, Japan

[21] Appl. No.: 207,555

[22] Filed: Mar. 8, 1994

[51] Int. Cl.$^6$ .............................. G02B 6/28; H04J 14/00
[52] U.S. Cl. .................. 385/24; 385/31; 385/33; 385/88; 385/92; 359/115; 359/131; 359/193; 359/124
[58] Field of Search ................... 385/14, 27, 28, 385/29, 24, 31, 33, 39, 42, 88, 89, 92, 93, 95, 96, 139; 359/115, 124, 131, 152, 153, 173, 161, 188, 193, 195

[56] References Cited

U.S. PATENT DOCUMENTS

| | | | |
|---|---|---|---|
| 4,932,742 | 6/1990 | Tohme | 385/33 X |
| 5,003,546 | 3/1991 | Lidgard et al. | 372/26 |
| 5,031,984 | 7/1991 | Eide et al. | 385/27 |
| 5,046,139 | 9/1991 | Kahn | 359/124 |
| 5,094,534 | 3/1992 | Cole et al. | 356/345 |
| 5,278,929 | 1/1994 | Tanisawa et al. | 385/93 |
| 5,315,680 | 5/1994 | Musk et al. | 385/88 |
| 5,359,689 | 10/1994 | Iwatsuka et al. | 385/73 |

OTHER PUBLICATIONS

Shibutani et al., "Reflection Induced Degradations in Optical Fiber . . . " IEKE Trans vol. E76–C No. 2 Feb. 1993 pp. 287–292.

J. C. Point, "1GH2 Multichannel . . . " CATV Sessions, 1992 pp. 334–341 (no month).

Tsuchiya et al., "Major Factors Affecting Fiber–Optic . . . " IEICE Trans Commun vol. E76–B No. 9 Sep. 1993 pp. 1136–1144.

Angenent, "Distortion of a Multicarrier Signal . . . " Pro. of 17th Eur. Conf. on Opt. Communications (ECOG 91') Wec8–4 4 pgs. (no month).

*Primary Examiner*—Brian Healy
*Attorney, Agent, or Firm*—Laff, Whitesel, Conte & Saret, Ltd.

[57] ABSTRACT

An optical module for use in a subcarrier multiplexed (SCM) optical transmission system and capable of reducing the distortion of a signal light due to multiple reflections. A distortion reducing device is implemented by an optical fiber cable longer than the coherence length of the signal light and is located at each of signal input and output portions or each portion where optical devices are jointed together within the module.

4 Claims, 2 Drawing Sheets

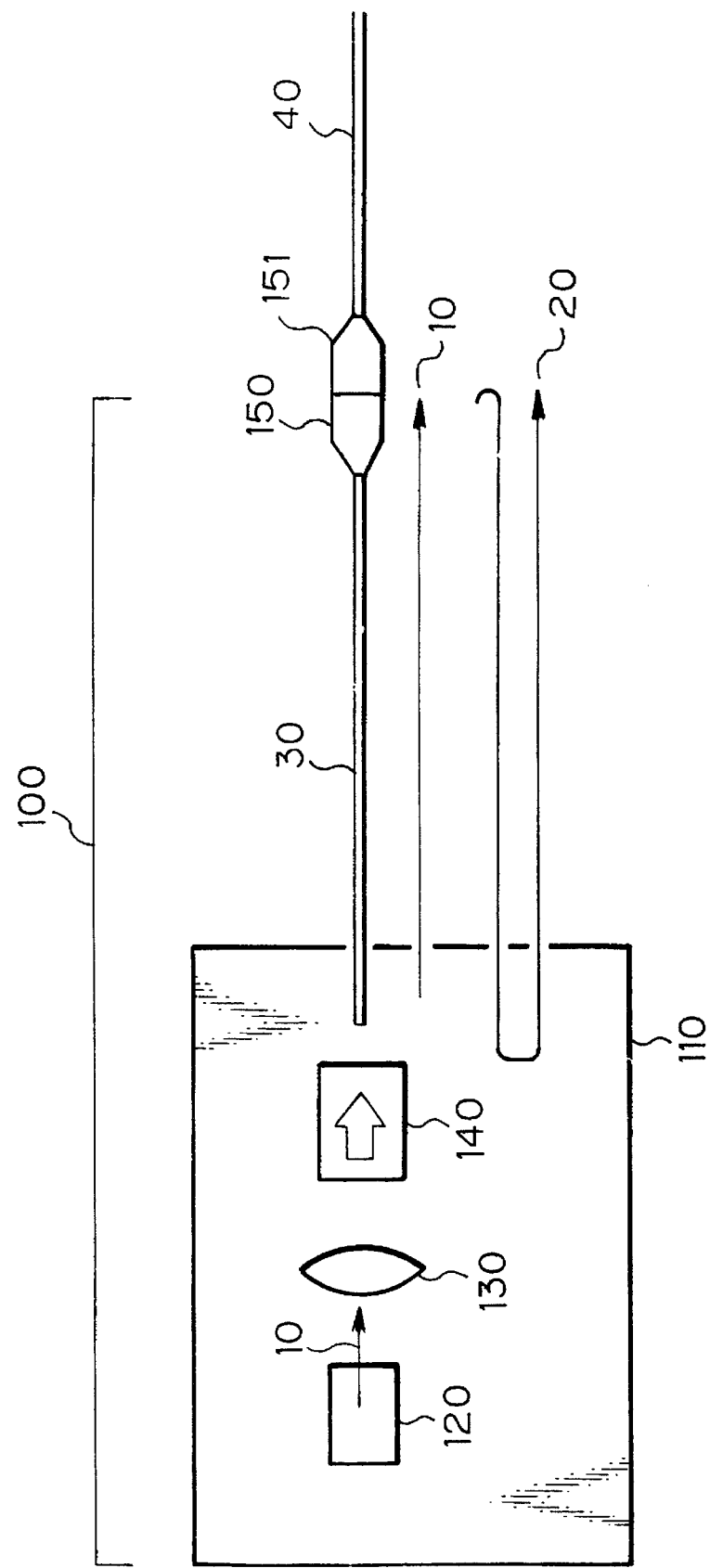

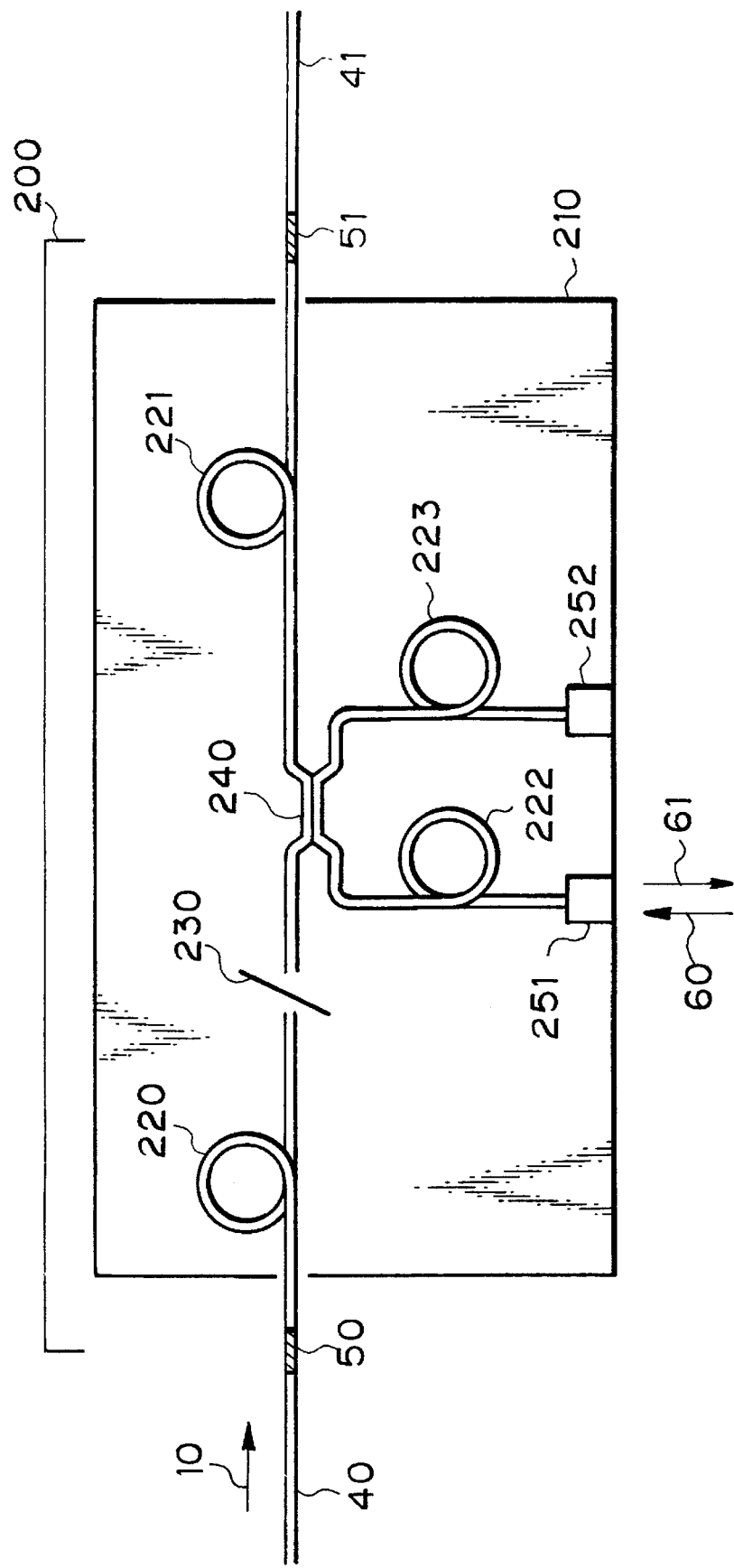

OPTICAL MODULE FOR SUBCARRIER MULTIPLEXED OPTICAL TRANSMISSION SYSTEM

BACKGROUND OF THE INVENTION

The present invention relates to an optical module for use in a subcarrier multiplexed (SCM) optical transmission system and capable of reducing the distortion of a signal light due to multiple reflections.

An SCM optical transmission system transits a signal light modulated by frequency-multiplexed carriers and can send multichannel video signals and radio signals at low cost. This kind of system is, therefore, a promising application to the trunk lines of cable television (CATV) systems, mobile radio communication systems, etc. The prerequisite with such an application is that distortions due to the interference between individual carriers, e.g., intermodulation distortion, higher harmonic distortion and mixed modulation distortion be strictly suppressed.

In the SCM transmission system, when multiple reflections occur, the transmitted signal involves distortions attributable to the interference between a signal light and a multiple reflected light. Distortions due to multiple reflections are discussed in, for example, W. Domon et al "Distortion due to Optical Reflection and Dispersion in Optical Fiber Feeder System", the Institute of Electronics, Information and Communication Engineers of Japan, Technical Report, OCS 91-79.

A laser diode, photodiode or similar optical device for use in the SCM transmission system is usually arranged in an optical module. The optical module is often connected to an optical fiber transmission part by an optical connector. In this condition, it is likely that the signal suffers from distortions due to multiple reflections between the reflection point of the transmission path and the module or multiple reflections between the module and the optical connector.

SUMMARY OF THE INVENTION

It is, therefore, an object of the present invention to provide an optical module for an SCM optical transmission system which is capable of reducing the distortion of a signal light due to multiple reflections.

In an SCM optical transmission system, an optical module of the present invention comprises a plurality of devices for reducing distortion due to optical reflection which are each located at a signal light input or output portion of the optical module and implemented by an optical fiber cable longer than the coherence length of the signal light.

Also, in an SCM transmission system, an optical module of the present invention comprises a plurality of devices for reducing distortion due to optical reflection which are each located at a portion where optical devices are joined together within the optical module. The devices are each implemented by an optical fiber cable longer than the coherence length of a signal light.

Further, an optical module for an SCM transmission system of the present invention comprises a light source for emitting a signal light, and a distortion reducing device for reducing distortion due to optical reflection. The distortion reducing device receives the signal light and propagates the signal light to an optical fiber transmission path and is implemented by an optical fiber cable longer than the coherence length of the signal light.

In addition, an optical module for an SCM transmission system of the present invention has a first distortion reducing device for receiving a signal light coming in over a first optical fiber transmission line. The first distortion reducing device is implemented by an optical fiber cable longer than the coherence length of the signal light. A second distortion reducing device receives the signal light from the first distortion reducing device and sends the signal light to a second optical fiber transmission light. The second distortion reducing device is also implemented by an optical fiber cable longer than the coherence length of the signal light.

BRIEF DESCRIPTION OF THE DRAWINGS

The above and other objects, features and advantages of the present invention will become more apparent from the following detailed description taken with the accompanying drawings in which:

FIG. 1 shows an optical module embodying the present invention; and

FIG. 2 shows an alternative embodiment of the present invention.

DESCRIPTION OF THE PREFERRED EMBODIMENTS

Referring to FIG. 1 of the drawings, an optical module embodying the present invention is shown. As shown, the module is implemented as a laser diode (LD) module 100 which plays the role of a light source for an SCM transmission system. The LD module 100 has a casing 110 accommodating an LD 120, a lens 130, and an optical isolator 140. A signal light 10 issuing from the LD 120 is routed through the lens 130 and isolator 140 to a device 30 which reduced distortion due to optical reflection. The optical reflection induced distortion reducing device 30 is coupled to an optical fiber transmission path 40 via optical connectors 150 and 151. In the illustrative embodiment, the device 30 is implemented by a 10 meters long optical fiber cable. The signal light 10 is partly reflected by the connector 150, propagated through the distortion reducing device 30, reflected by the surface of the isolator 140, and again propagated through the device 30. As a result, a multiple reflected light 20 is input to the optical fiber transmission path 40.

Assuming a signal light having a linewidth of $\Delta f$, then the coherent length $L(m)$ of the signal light is generally expressed as:

$$L = c/(2 \cdot \pi \cdot n \cdot \Delta f)$$

where c is a velocity of light, and n is the refractive index of a transmission medium (about 1.5 in the case of an optical fiber). In the embodiment, the signal light 10 is assumed to have a linewidth $\Delta f$ of 5 MHz, so that the coherent length is about 6.4 meters. The 10 meters long optical fiber cable, implementing the distortion reducing device 30, was found to allow a minimum of interference to occur between the signal light 10 and the multiple reflected light 20. In the embodiment, the connector 150 has a reflectance of −25 dB while the reflectance due to the surface reflection of the isolator 130 is −35 dB. Under these conditions, the distortions of received signals were measured by use of two carriers having frequencies of 800 MHz and 801 MHz, respectively, and modulating signal lights by an optical intensity modulation index of 20% per carrier. The measurement showed that the third-order intermodulation distortion is less than −80 dBc. By contrast, when the distortion reducing device 30 was absent, the third-order intermodulation distortion was measured to be −75 dBc. This indicates that the distortion reducing device 30 improves the distortion due to multiple reflections by more than 5 dB.

FIG. 2 shows an alternative embodiment of the present invention which is implemented as an optical branch module 200. Briefly, the optical brace module 200 is used to locate, when an optical fiber transmission line is broken, the broken point of the line, i.e., to effect a so-called OTDR test. For the OTDR test and optical branch module, a reference may be made to, for example, N. Tomita et al "OPERATION AND MAINTENANCE SYSTEM TECHNOLOGY FOR OPTICAL SUBSCRIBER LOOP", the Insatiate of Electronics, Information and Communication Engineers of Japan, Technical Report, CS92-18. Specifically, the module 200 is connected to optical fiber transmission paths 40 and 41 via optical reflection induced distortion reducing devices 220 and 221, respectively. To connect the devices 220 and 221 to the transmission paths 40 and 41, respectively, optical fibers are melted by splice members 50 and 51. The module 200 includes reflection induced distortion reducing device 222 and 223, a test light intercepting filter 230, an optical fiber coupler 240, and optical connectors 251 and 252 in addition to the distortion reducing devices 220 and 221. A signal light 10 from the optical path 40 and having a wavelength of 1.31 μm is routed through the splice member 50, distortion reducing device 220, test light intercepting filter 230, optical fiber coupler 240, distortion reducing device 221 and splice member 51 to the transmission path 41. On the other hand, a test light 60 for an OTDR test, whose wavelength is 1.55 μm, is input to the optical connector 251 and then routed through the distortion reducing device 222, optical fiber coupler 240, distortion reducing device 221, and splice member 51 to the transmission path 41. A reflected test light 61 attributable to backscattering on the transmission path or reflection at a broken point thereof is output from the optical connector 251 via the splice member 51, distortion reducing device 221, optical fiber coupler 240, and distortion reducing device 222.

In the illustrative embodiment, the signal light 10 has a linewidth Δf of 10 MHz, so that the coherent length thereof is about 3.2 meters. The optical fiber cables, each implementing one of the distortion reducing devices 220–223, are 10 meters long each and far longer than the coherent length of the signal light 10. In the embodiment, the splice members 50 and 51 each has a reflectance of −45 dB, the filter 230 has a reflectance of −30 dB, the optical fiber coupler 240 has a reflectance of −50 dB, and the optical connectors 251 and 252 each has a reflectance of −30 dB. Even under these conditions, hardly any distortion due to multiple reflections was observed.

In summary, it will be seen that the present invention provides an optical module for an SCM optical transmission system which reduces distortions attributable to multiple reflections.

Various modifications will become possible for those skilled in the art after receiving the teachings of the present disclosure without departing from the scope thereof.

What is claimed is:

1. An optical module for an SCM transmission system, comprising:

an SCM light source for emitting a signal light, said light source comprises a laser diode for emitting the signal light, a lens, and an optical isolator; and distortion reducing means for reducing distortion due to optical reflection, said distortion reducing means receiving the SCM signal light from said source and propagating said signal light to an optical fiber transmission path, and said distortion reducing means being implemented by an optical fiber cable which is longer than a coherence length of said signal light.

2. An optical module for an SCM transmission system, comprising:

first distortion reducing means for receiving an SCM signal light coming in over a first optical fiber transmission line, said first distortion reducing means being implemented by an optical fiber cable longer than a coherence length of said signal light;

second distortion reducing means for receiving the signal light from said first distortion reducing means and for sending said signal light to a second optical fiber transmission light, said second distortion reducing means being implemented by an optical fiber cable longer than the coherent length of said signal light;

optical fiber coupler connecting said first and second distortion reducing means;

first splice means connecting said first optical fiber transmission path and said first distortion reducing means; and second splice means connecting said second distortion reducing means and said second optical fiber transmission path.

3. An optical module as claimed in claim 2, further comprising third distortion reducing means for receiving a test light and transferring said test light to said second optical fiber transmission path via said optical fiber coupler, said second distortion reducing means, and said second splice means.

4. An optical module as claimed in claim 3, further comprising filter means interposed between said first distortion reducing means and said optical fiber coupler for intercepting the test light.

\* \* \* \* \*